Figure 2:
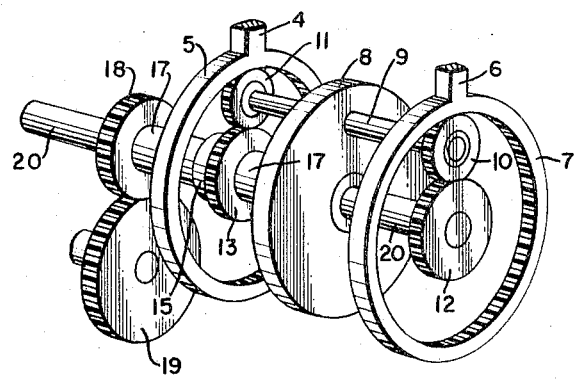

United States Patent Office 3,301,093
Patented Jan. 31, 1967

3,301,093
DRIVE MECHANISMS
Alfred P. Ewert, Arlington, Va., assignor to American Machine & Foundry Company, a corporation of New Jersey
Filed Nov. 8, 1963, Ser. No. 322,464
8 Claims. (Cl. 74—675)

This invention relates to mechanical drive mechanisms, and more particularly to drive mechanisms capable of controlling the angular displacement between two members while being rotated in synchronism thereby.

There has long been a need for a simple mechanism for rotating a pair of members in synchronism and which is capable of accurately controlling the angular displacement between these rotating members. Although the invention is not limited to any particular use, it has been found to be particularly advantageous in automatic positioning apparatus of the type described in copending application Serial No. 322,458, filed November 8, 1963, in the name of Ralph Townsend. In the copending application, systems are described wherein a pair of magnetic transducers are coupled to a movable member to be positioned so that the angular displacement between the transducers is always a function of the movable member position. The movable member position can be recorded by energizing the transducers simultaneously to record a pair of magnetic marks on a suitable recording medium so that the angular displacement between the marks is representative of the movable member position. Subsequently, the movable member can again be placed in the same position, a condition which is detected when the angular displacement between the two transducers is identical to the angular displacement between the previously recorded marks. In a magnetic system of this type, it is preferable that there always be relative movement between the transducers and the recording medium.

Accordingly, it is an object of this invention to provide a mechanism capable of accurately controlling the angular displacement between two continuously rotating members.

It is another object to provide such a mechanism capable of rotating a pair of magnetic transducers with respect to a stationary recording medium while accurately controlling the angular displacement between the transducers.

It is still another object of the invention to provide a mechanism capable of controlling the angular displacement between a pair of rotating members wherein positive gear drive is used throughout to provide accurate control over the angular displacement.

The rotating members with controlled angular displacement in accordance with this invention are a pair of internal gears. These internal gears are driven by a pair of idler gears which revolve in synchronism about a stationary gear and an index gear, respectively. If the index gear is stationary, the internal gears will be rotated at the same angular velocity with no change in angular displacement. The angular displacement between the internal gears can be varied by rotating the index gear with respect to the stationary gear.

Figure 1:
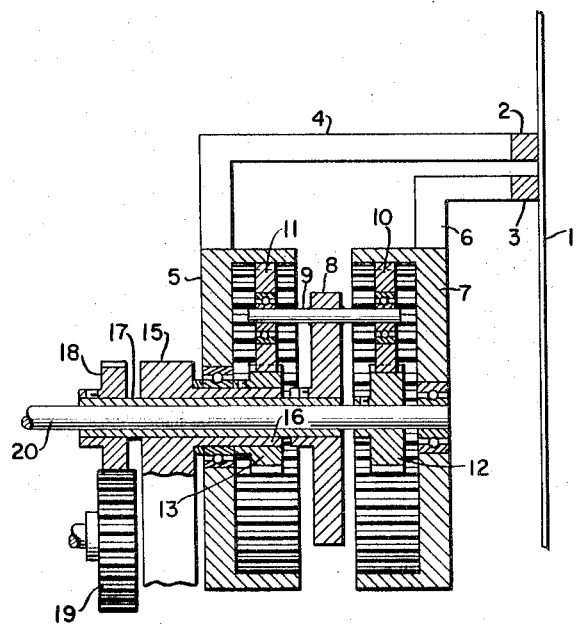

The invention is described in greater detail in the following specification and drawings. The drawings form a portion of the specification and include:

FIG. 1, which is a cross-sectional view showing the arrangement of the gears and other components; and FIG. 2, which is an exploded perspective view, with some parts removed, illustrating the same gear displacement.

For purposes of illustration, the invention is shown as a drive mechanism for rotating the pair of transducers 2 and 3 with respect to a suitable stationary magnetic recording medium 1 which may be of any suitable material coated with a magnetic substance such as iron oxide. Transducers 2 and 3 are conventional magnetic read-write heads capable of recording magnetic marks on the recording medium and also capable of detecting previously recorded marks. The drive mechanism rotates the transducers with respect to the recording medium and also controls the angular displacement between the transducers.

Transducer 2 is securely attached to the external surface of an internal gear 5 by means of an arm 4. In like fashion, transducer 3 is secured to the external surface of an internal gear 7 by means of an arm 6. These internal gears are shown as ring gears 5 and 7 in FIG. 2 for clarity of illustration.

A drive member in the form of a disc 8 is adapted for continuous rotation and is disposed between internal gears 5 and 7 in a plane parallel to the internal gears. The axis of rotation for the drive disc is coincident with the axis of rotation for the internal gears. A shaft 9 extends through drive disc 8 and is rigidly secured thereto at a point spaced from and parallel to the axis of rotation of the drive disc.

A pair of idler gears 10 and 11 are journaled to the free ends of shaft 9 by means of suitable ball bearings. Idler gear 10 is adapted to mesh with and revolve about an indexing gear 12 and also mesh with the teeth of internal gear 7. In like fashion, idler gear 11 is adapted to mesh with and revolve about a stationary gear 13 and mesh with the teeth of internal gear 5. In installations where it is desirable that the internal gears rotate at the same angular speed, the gear train including gears 5, 11 and 13 in one plane parallel to the drive disc, should be identical to the gear train including gears 7, 10 and 12 in another plane parallel to the drive disc. In other words, gears 12 and 13 should have the same pitch diameter and a coincident axis, idler gears 10 and 11 should have the same pitch diameter and internal gears 5 and 7 should have the same pitch diameter.

As illustrated in FIG. 1, the various gears are mounted on concentric shafts journaled within a stationary bearing housing 15 of any suitable configuration and including an annular boss 16 extending through internal gear 5 and stationary gear 13. Stationary gear 13 is rigidly secured to the free end of boss 16. Internal gear 5 is mounted, by means of suitable ball bearings, on boss 16 between gear 13 and the portion of housing 15 from which the boss extends, so that internal gear 5 is free to rotate.

A hollow shaft 17 extends through housing 15 and the boss 16, and is freely rotatable therein. Drive disc 8 is rigidly secured to one end of hollow shaft 17 and a pinion gear 18 is secured to the other end. A drive gear 19, which may be connected to a constant speed electric motor (not shown) meshes with pinion gear 18 to rotate shaft 17 and drive disc 8 at a suitable constant angular velocity.

A shaft 20 extends axially through the hollow shaft 17 and freely rotatable therein. Index gear 12 is rigidly secured to shaft 20 and internal gear 7 is journaled at the end of the shaft by means of a ball bearing. Thus, rotation of shaft 20 rotates index gear 12 with respect to stationary gear 13.

If shaft 20 is stationary and drive disc 8 is rotated at a constant angular speed by means of gears 18, 19 and hollow shaft 17, idler gears 10 and 11 will revolve in mesh about gears 12 and 13, and therefore will drive internal gear 5 at the same angular velocity as internal gear 7. When index gear 12 is rotated by means of shaft 20, the angular velocity of internal gear 7 will be affected momentarily, causing internal gear 7 to assume a new angular position with respect to internal gear 5. Thus, the angular displacement between stationary gear 13 and index gear 12 accurately controls the angular displacement between continuously rotating internal gears 5 and 7.

While only one embodiment of the invention has been illustrated in detail, it should be obvious that there are numerous variations within the scope of the invention. For example, it may be desirable to utilize several sets of idler gears to achieve better balance. Also, it may be desirable to utilize split gear anti-backlash arrangements to increase the precision of the angular displacement control. Furthermore, the gear trains may easily be modified to accomplish other results, such as having the internal gears rotate in synchronism at different angular velocities. The scope of the invention is more particularly defined in the appended claims.

What is claimed is:

1. In a mechanism for rotating two members in synchronism and for controlling angular displacement between the two members, the combination comprising
    a pair of driven gears each adapted for connection to one of the two members for rotating the two members;
    a stationary gear;
    an index gear axially alined with the stationary gear and angularly positionable relative thereto;
    a pair of idler gears, one disposed between and in mesh with the stationary gear and one of the driven gears, and the other disposed between and in mesh with the index gear and the other of the driven gears;
    first means connected to each of the idler gears for causing the idler gears to revolve in synchronism, respectively, about the stationary gear and the index gear to thereby drive the driven gears in synchronism when the index gear is stationary; and
    second means connected to the index gear for controlling the angular position thereof with respect to the stationary gear to thereby control the angular displacement between the driven gears.

2. The mechanism in accordance with claim 1, wherein
    the first means comprises a drive member rotatable about an axis and having a shaft extending at right angles therefrom and displaced from the axis of rotation of the drive member; and
    the idler gears are rotatably mounted on the shaft and are revolved, respectively, about the stationary gear and the index gear when the drive member rotates.

3. The mechanism in accordance with claim 2, and further comprising
    a bearing housing;
    a hollow shaft journaled in the housing and rigidly secured to drive member to rotate the drive member about its axis of rotation when the hollow shaft rotates; and
    another shaft journaled in the hollow shaft and rigidly secured to the index gear for controlling the angular position thereof with respect to the stationary gear; and wherein
    the stationary gear is rigidly secured to the housing; and
    the pair of driven gears are journaled, one on the housing and the other on the other shaft.

4. In a mechanism for driving two members in synchronism and for controlling angular displacement between the two members, the combination comprising
    a first gear train including a first internal gear adapted for connection to one of the members, a stationary gear and a first idler gear in mesh with the first internal gear and stationary gear;
    a second gear train including a second internal gear adapted for connection to the other of the members, an index gear and a second idler gear in mesh with the second internal gear and the index gear;
    a common drive means connected to both of the idler gears for causing the first and second idler gears to revolve in synchronism about the stationary and index gears, respectively, to rotate the first and second internal gears in synchronism; and
    means connected to the index gear for controlling the angular position thereof relative to the stationary gear to thereby control the angular displacement between the first and second internal gears.

5. A mechanism in accordance with claim 4, wherein
    the common drive means comprises a drive member rotatable about an axis and having a shaft extending therefrom displaced from and parallel to the axis of rotation of the drive member; and
    the idler gears are journaled on the shaft and are revolved, respectively, about the stationary gear and the index gear when the drive member rotates.

6. In combination with a pair of transducers, a mechanism for continuously driving the transducers in synchronism with respect to a recording medium and for controlling angular displacement therebetween, comprising
    a pair of substantially identical drive gears axially alined with each other;
    each of the transducers being connected to a different one of the drive gears to be driven thereby;
    a stationary gear;
    an index gear axially alined with and substantially identical to the stationary gear;
    a pair of substantially identical idler gears, one in mesh with one of the drive gears and the stationary gear, and the other in mesh with the other of the drive gears and the index gear;
    a common means connected to the idler gears for revolving the idler gears in synchronism, respectively, about the stationary gear and the index gear to drive in synchronism the pair of drive gears when the index gear is stationary thereby driving the transducers in synchronism; and
    other means connected to the index gear for controlling the angular position thereof relative to the stationary gear thereby controlling angular displacement between the transducers.

7. The combination in accordance with claim 6, wherein
    the pair of drive gears are internal gears axially alined with the stationary gear and the index gear;
    one of the pair of drive gears being disposed on substantially the same plane as and encircling in spaced relationship the stationary gear;
    the other of the pair of drive gears being disposed on substantially the same plane as and encircling in spaced relationship the index gear; and
    one of the idler gears being disposed between the stationary gear and one of the drive gears, and the other of the idler gears being disposed between the index gear and the other of the drive gears.

8. The combination in accordance with claim 7, further comprising a bearing housing, and wherein the common means comprising a hollow shaft journaled in the housing and axially alined with the pair of drive gears and the index and stationary gears, and a drive member rigidly secured to the hollow shaft to be rotated thereby and having a shaft extending therefrom which is spaced from and parallel to the hollow shaft;

the idler gears being journaled on the shaft extending from the drive member;

the other means comprising a shaft journaled in the hollow shaft and rigidly secured to the index gear;

the stationary gear is rigidly secured to the housing; and the drive gears are journaled, one on the housing and one on the shaft secured to the index gear.

References Cited by the Examiner

UNITED STATES PATENTS

| | | | |
|---|---|---|---|
| 1,933,644 | 11/1933 | Trump | 74—675 |
| 2,020,366 | 11/1935 | MacCallum | 74—675 |
| 2,577,604 | 12/1951 | Chillson | 74—675 |
| 3,013,519 | 12/1961 | Wiggerman | 74—675 |

FOREIGN PATENTS

| | | |
|---|---|---|
| 1,074,243 | 1/1960 | Germany. |
| 678,531 | 9/1952 | Great Britain. |
| 430,690 | 2/1948 | Italy. |

DAVID J. WILLIAMOWSKY, *Primary Examiner.*

THOMAS C. PERRY, *Examiner.*